US012675234B2

(12) United States Patent
Tang et al.

(10) Patent No.: US 12,675,234 B2
(45) Date of Patent: Jul. 7, 2026

(54) METHODS AND APPARATUSES FOR OPERATING A MEMORY SYSTEM

(71) Applicant: Yangtze Memory Technologies Co., Ltd., Wuhan (CN)

(72) Inventors: Xingwei Tang, Wuhan (CN); Lu Guo, Wuhan (CN); Kun Ren, Wuhan (CN); Wen Luo, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 19/019,861

(22) Filed: Jan. 14, 2025

(65) Prior Publication Data

US 2026/0126931 A1      May 7, 2026

Related U.S. Application Data

(63) Continuation of application No. PCT/CN2024/129600, filed on Nov. 4, 2024.

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0644* (2013.01); *G06F 3/0679* (2013.01); *G06F 12/0246* (2013.01)

(58) Field of Classification Search
CPC .... G06F 3/0655; G06F 3/0604; G06F 3/0644; G06F 3/0679
See application file for complete search history.

(56) References Cited

U.S. PATENT DOCUMENTS

| | | |
|---|---|---|
| 2015/0095558 A1 | 4/2015 | Kim et al. |
| 2015/0332770 A1* | 11/2015 | Kim ........................ G11C 16/20 365/185.12 |
| 2020/0211603 A1* | 7/2020 | Luo ........................ G06F 11/076 |
| 2020/0348885 A1 | 11/2020 | Zhang et al. |
| 2021/0109856 A1* | 4/2021 | Lee ....................... G06F 11/3037 |
| 2021/0166769 A1 | 6/2021 | Liang et al. |
| 2021/0240397 A1 | 8/2021 | Zhang et al. |
| 2021/0280258 A1 | 9/2021 | Liang et al. |
| 2022/0165741 A1 | 5/2022 | Xie et al. |
| 2022/0189566 A1 | 6/2022 | Lee et al. |
| 2022/0254417 A1 | 8/2022 | Wang et al. |
| 2022/0293187 A1 | 9/2022 | Guo et al. |
| 2023/0020789 A1 | 1/2023 | Lee et al. |
| 2024/0302981 A1 | 9/2024 | Hwang et al. |

OTHER PUBLICATIONS

Office Action in Korean Appln. No. 10-2025-7028482, mailed on Nov. 21, 2025, 8 pages (with Machine translation).
International Search Report and Written Opinion in International Appln. No. PCT/CN2024/129600, mailed on Feb. 21, 2025, 16 pages.

* cited by examiner

*Primary Examiner* — Kevin Verbrugge
(74) *Attorney, Agent, or Firm* — Fish & Richardson P.C.

(57) ABSTRACT

Methods, devices, and systems for managing memory devices are provided. In one aspect, a memory system can include a memory device including memory pages, a memory controller coupled to the memory device. The memory controller is configured to send, to the memory device, a first command indicating to identify dummy data, and in response to receiving, from the memory device, a response indicating that a first memory page is a zero page, determine data comprised in the first memory page as dummy data.

20 Claims, 11 Drawing Sheets

202

104

MEMORY
DEVICE

MEMORY
CONTROLLER

106

204

206

104

| MEMORY DEVICE | MEMORY DEVICE | MEMORY DEVICE |
|---|---|---|
| MEMORY DEVICE | MEMORY DEVICE | MEMORY DEVICE |

MEMORY CONTROLLER

106

208

1000

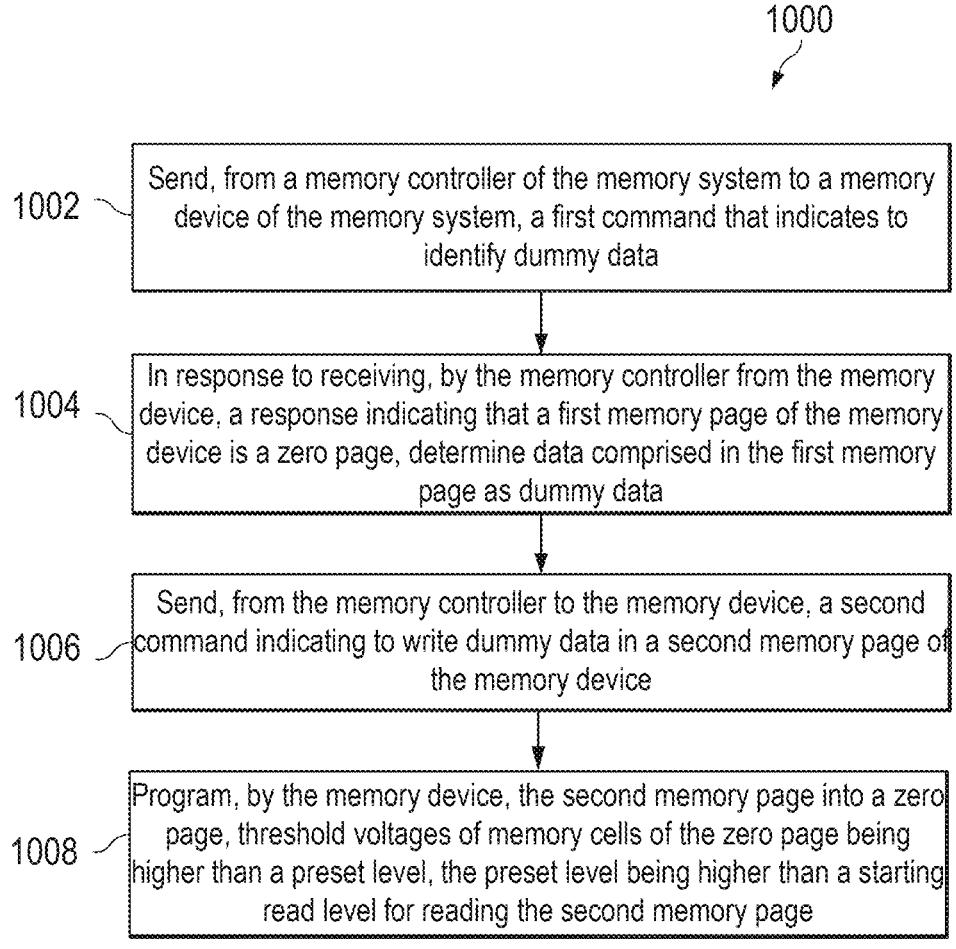

1002 — Send, from a memory controller of the memory system to a memory device of the memory system, a first command that indicates to identify dummy data 1004 — In response to receiving, by the memory controller from the memory device, a response indicating that a first memory page of the memory device is a zero page, determine data comprised in the first memory page as dummy data 1006 — Send, from the memory controller to the memory device, a second command indicating to write dummy data in a second memory page of the memory device 1008 — Program, by the memory device, the second memory page into a zero page, threshold voltages of memory cells of the zero page being higher than a preset level, the preset level being higher than a starting read level for reading the second memory page

FIG. 10

METHODS AND APPARATUSES FOR OPERATING A MEMORY SYSTEM

CROSS-REFERENCE TO RELATED APPLICATIONS

This application is a continuation of International Application No. PCT/CN2024/129600, filed on Nov. 4, 2024, the disclosure of which is hereby incorporated by reference in its entirety.

TECHNICAL FIELD

The present disclosure generally relates to memory devices and memory systems, and in particular, to programming and identifying dummy data in memory systems.

BACKGROUND

Flash memory is a low-cost, high-density, nonvolatile solid-state storage medium that can be electrically erased and reprogrammed. Flash memory includes NOR flash memory and NAND flash memory. Various operations can be performed by flash memory, for example, program (write) and erase operations, to change the threshold voltage of each memory cell to a respective level. For NAND flash memory, an erase operation can be performed at the memory block level, a program operation can be performed at the page level, and a read operation can be performed at the page level.

SUMMARY

The present disclosure involves methods, apparatuses, and systems for programming and identifying dummy data in a memory system. One aspect of the present disclosure features a memory system including a memory device including memory pages, and a memory controller coupled to the memory device. The memory controller is configured to send to the memory device a first command indicating to identify dummy data, and in response to receiving from the memory device a response indicating that a first memory page is a zero page, determine data included in the first memory page as dummy data.

In some implementations, the memory controller is further configured to send a second command indicating to write dummy data in a second memory page. The memory device is configured to, in response to receiving the second command, program the second memory page into a zero page. Threshold voltages of memory cells of the zero page are higher than a preset level. The preset level is higher than a starting read level for reading the second memory page.

In some implementations, the second command indicates to program the second memory page based on a single-level cell (SLC) mode.

In some implementations, programming the second memory page based on the SLC mode includes programming, using a single program pulse, memory cells of the second memory page above the preset level.

In some implementations, a low density parity check (LDPC) encoder of the memory controller is disabled when programming the second memory page.

In some implementations, the memory device is configured to send the response indicating that the first memory page is a zero page, without sending the data included in the first memory page to the memory controller.

In some implementations, the memory device is configured to perform, based on a starting read voltage, a read operation on the first memory page; determine a quantity of failed memory cells in the first memory page, where threshold voltages of the failed memory cells are lower than the starting read voltage; and in response to determining that the quantity of failed memory cells is less than a threshold, send the response indicating that the first memory page is a zero page.

In some implementations, the memory controller is configured to send the first command during a garbage collection operation of the memory system.

In some implementations, the memory controller is configured to send the second command during a power-loss protection operation. The second memory page is included in an open memory block.

In some implementations, the memory controller is configured to send the second command after a program operation for programming user data into one or more memory pages. The second memory page immediately follows a last memory page of the one or more memory pages.

Another aspect of the present disclosure features a memory controller. The memory controller includes at least one processor and an interface. The at least one processor is configured to send, through the interface to a memory device, a first command that indicates to identify dummy data; and in response to receiving, through the interface from the memory device, a response indicating that a first memory page is a zero page, determine data included in the first memory page as dummy data.

In some implementations, the memory controller is configured to send a second command indicating to write dummy data in a second memory page. The second command indicates to program the second memory page based on a single-level cell (SLC) mode.

In some implementations, a low density parity check (LDPC) encoder of the memory controller is disabled when programming the second memory page.

In some implementations, the memory controller is configured to send the second command during a power-loss protection operation. The second memory page is included in an open memory block.

In some implementations, the memory controller is configured to send the second command after a program operation for programming user data into one or more memory pages. The second memory page immediately follows a last memory page of the one or more memory pages.

In some implementations, the memory controller is configured to send the first command during a garbage collection operation.

Another aspect of the present disclosure features a method of operating a memory system. The method includes sending, from a memory controller of the memory system to a memory device of the memory system, a first command that indicates to identify dummy data; and in response to receiving, by the memory controller from the memory device, a response indicating that a first memory page of the memory device is a zero page, determining data included in the first memory page as dummy data.

In some implementations, the method further includes performing, based on a starting read voltage, a read operation on the first memory page; determining a quantity of failed memory cells in the first memory page, where threshold voltages of the failed memory cells are lower than the starting read voltage; and in response to determining that the quantity of failed memory cells is less than a threshold, sending, from the memory device to the memory controller, the response indicating that the first memory page is a zero page.

In some implementations, the method includes sending, from the memory controller to the memory device, a second command indicating to write dummy data in a second memory page of the memory device; and programming, by the memory device, the second memory page into a zero page. Threshold voltages of memory cells of the zero page are higher than a preset level, and the preset level is higher than a starting read level for reading the second memory page.

In some implementations, the method includes sending, from the memory device to the memory controller, the response indicating that the first memory page is a zero page, without sending the data included in the first memory page.

Another aspect of the present disclosure features a non-transitory, computer-readable medium. The non-transitory, computer-readable medium stores one or more instructions executable by a memory system to perform operations including sending, from a memory controller of the memory system to a memory device of the memory system, a first command that indicates to identify dummy data; and in response to receiving, by the memory controller from the memory device, a response indicating that a first memory page of the memory device is a zero page, determining data included in the first memory page as dummy data.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

4

Figures 7A, 7B:
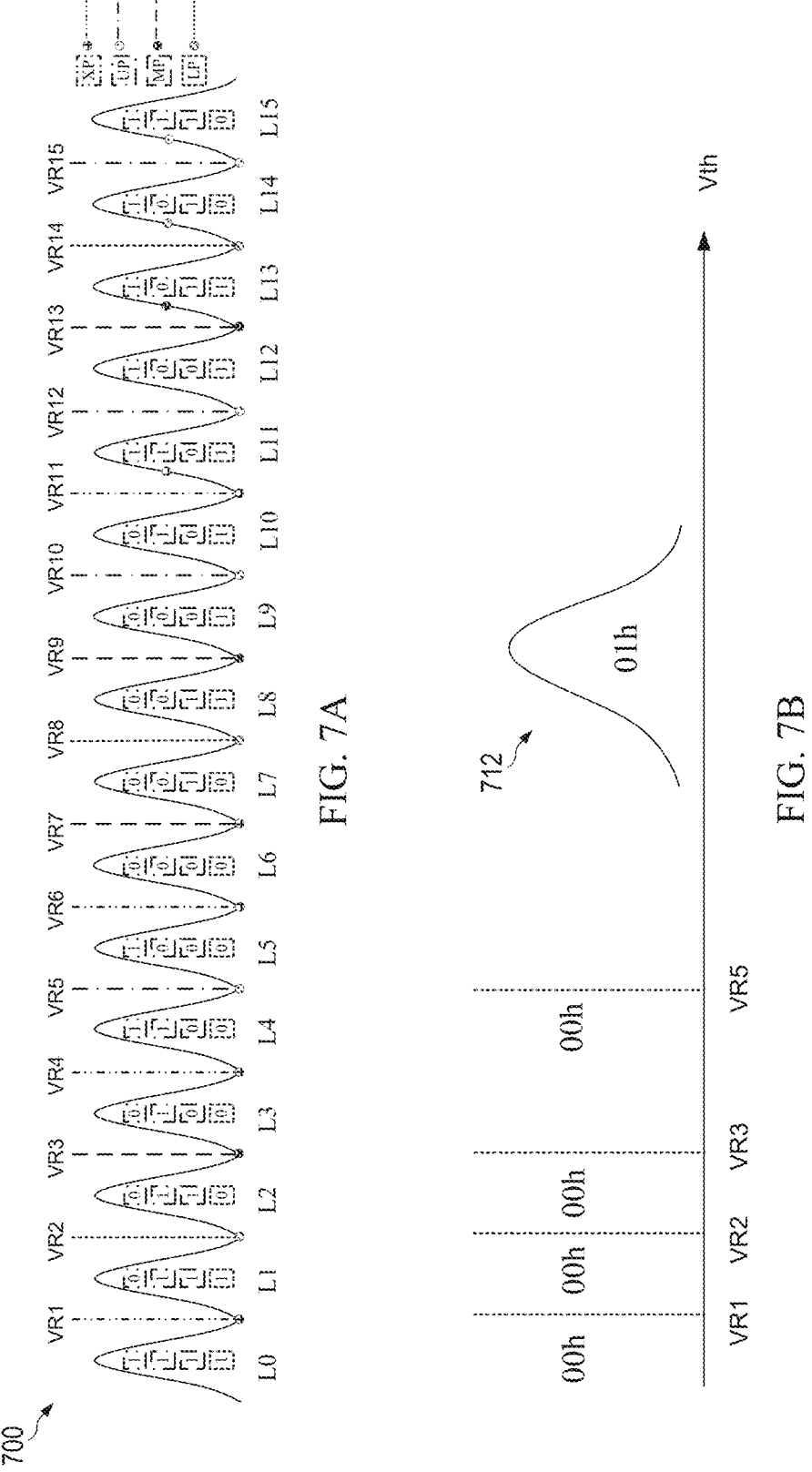

FIG. 7A illustrates an example of threshold voltage distributions of memory cells in a quad-level cell (QLC) memory device, according to some aspects of the present disclosure.

FIG. 7B illustrates a schematic diagram of an example threshold voltage distribution of memory cells associated with a zero page in a QLC memory device, according to some aspects of the present disclosure.

Figure 8:
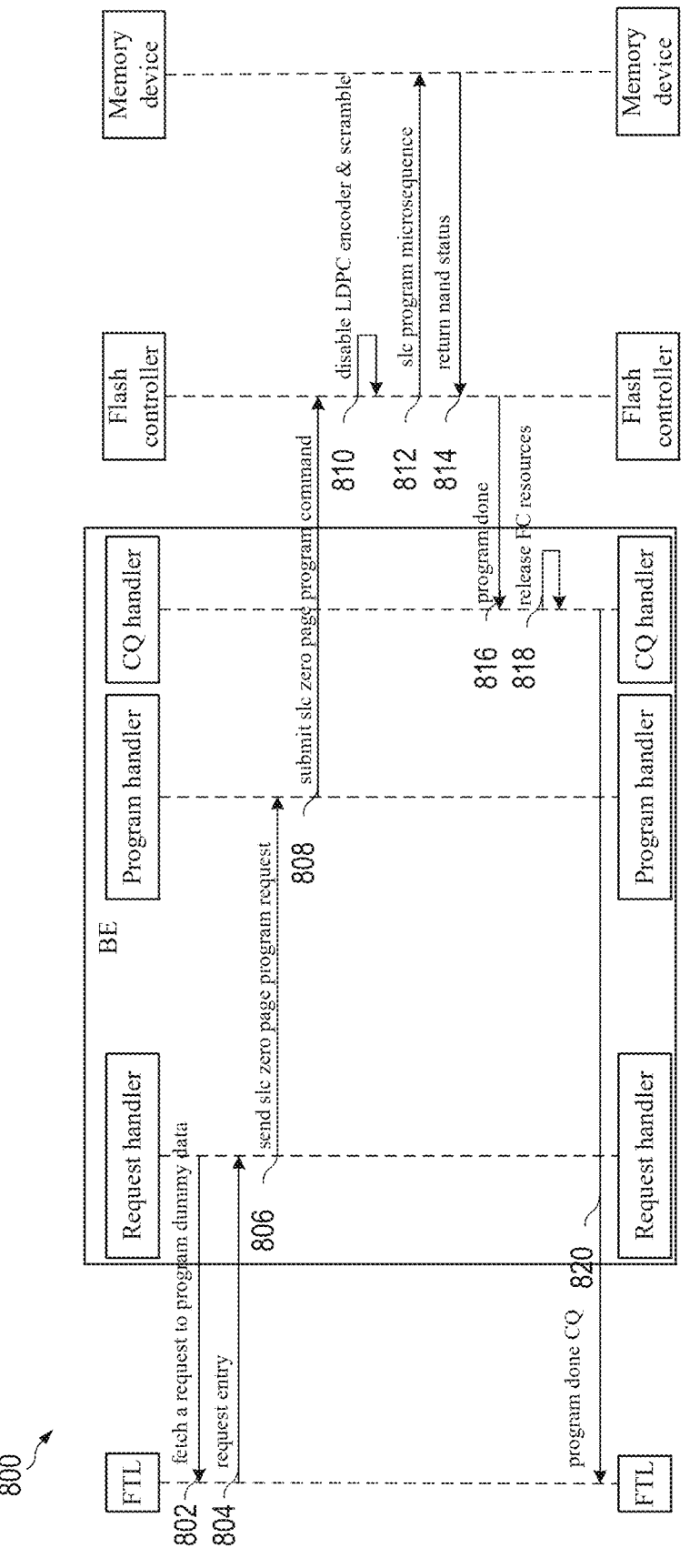

FIG. 8 illustrates an example process of programming dummy data in a memory system, according to some aspects of the present disclosure.

Figure 9:
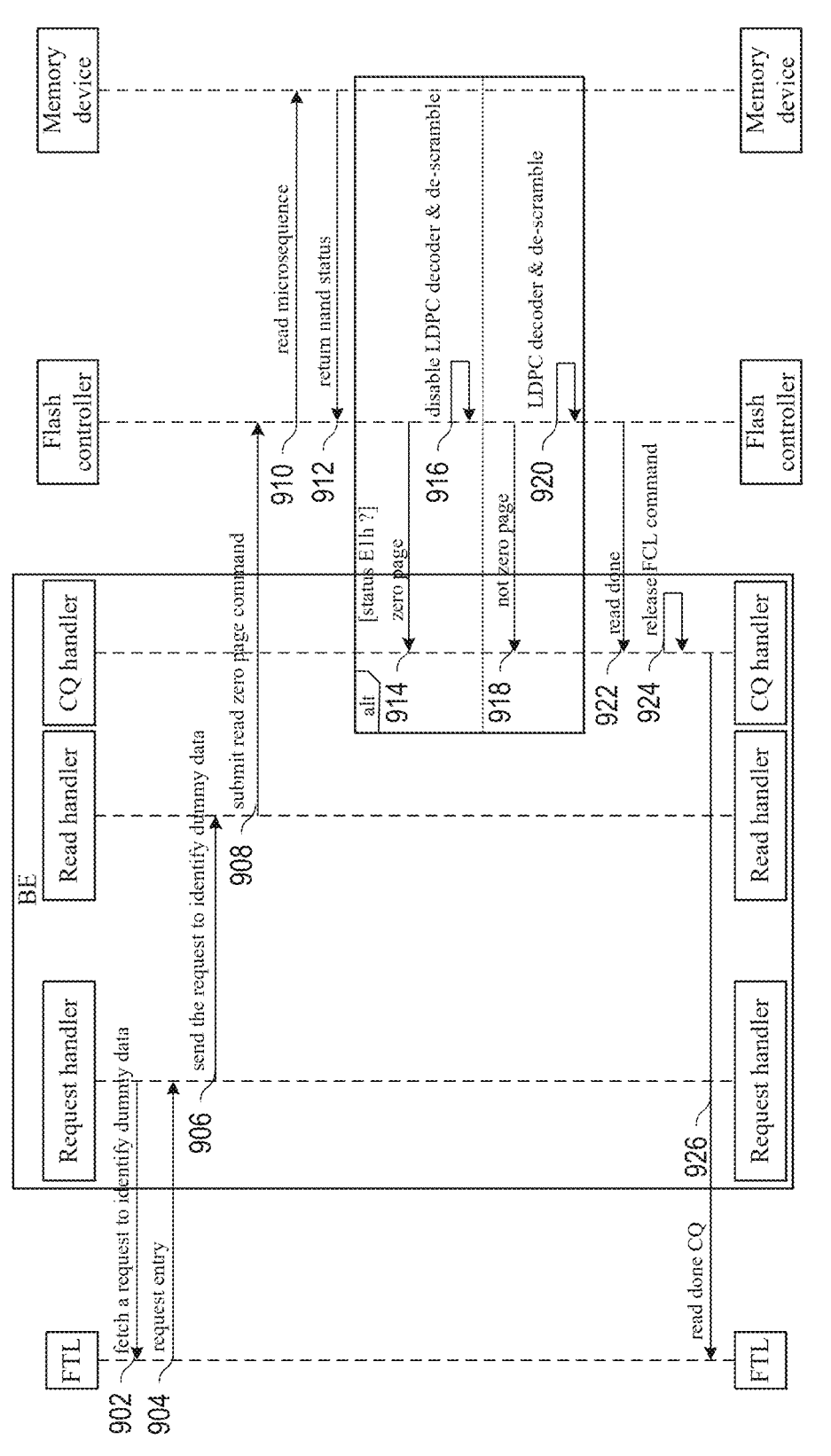

FIG. 9 illustrates an example process of identifying dummy data in a memory system, according to some aspects of the present disclosure.

FIG. 10 illustrates a flow chart of an example method of operating a memory system, according to some aspects of the present disclosure.

Like reference numbers and designations in the various drawings indicate like elements.

DETAILED DESCRIPTION

This specification relates to memory devices, memory systems, and methods for programming (writing) and identifying dummy data in a memory system. The memory system includes a memory device (e.g., a NAND memory device) and a memory controller. The memory device can store data in memory pages. In some cases, the memory device can write dummy data in memory pages, for example, to close an open word line, or close an open memory block.

For instance, in a triple-level cell (TLC) or a quad-level cell (QLC) memory device, the memory device writes dummy data to a memory page by programming the memory page based on a TLC/QCL mode, where the memory device receives all-zero data from the memory controller and programs corresponding memory cells using a set of program pulses of an incremental step pulse programming (ISPP) scheme. Writing dummy data based on a TLC/QLC mode can be time-consuming. For example, it may be challenging to finish writing dummy data based on the TLC/QLC mode during a power-loss protection operation.

Further, in some cases, the memory device identifies dummy data by performing a read operation on a memory page. By applying a set of read voltages, the memory device reads data from the memory page, and sends the data to the memory controller. The memory controller determines whether the data comprises all zeros (e.g., based on logic addresses comprised in metadata corresponding to the data), and thereby determines whether the data is dummy data. Identifying dummy data by sending data to the memory controller can also be time-consuming, and may occupy a large buffer space in the memory controller.

The present disclosure provides techniques to write dummy data and identify dummy data in a faster and more efficient way. In some implementations, a memory device can write dummy data to a memory page by programming the memory page into a zero page (e.g., comprising all zeros) based on a single-level cell (SLC) mode. Under the SLC mode, the memory device applies a single program pulse to program corresponding memory cells to a state higher than a threshold level. The threshold level is higher than a starting read voltage for reading each memory page of the memory device. For example, in a TLC memory device, the threshold level is higher than starting read voltages for reading a lower page, a middle page, and an upper page, respectively. For example, in a QLC memory device, the threshold level is higher than starting read voltages for reading a lower page, a middle page, an upper page, and an extra page, respectively.

Further, the memory device can identify dummy data without sending data to the memory controller. In some implementations, the memory device can apply a starting read voltage (e.g., VR1) to sense a memory page (e.g., a TLC lower page), and determine a quantity of failed memory cells among memory cells associated with the memory page. The threshold voltages of the failed memory cells are lower than the starting read voltage. If the quantity of failed memory cells is less than a threshold value (e.g., 10% or 5% of the quantity of memory cells associated with the memory page), the memory device can identify the memory page as a zero page. In such case, the memory device can end the read operation without applying subsequent read voltages, and send a response to the memory controller indicating that the memory page is a zero page. Data comprised in the zero page can thereby be identified as dummy data.

The described techniques can achieve one or more technical effects. For example, the described techniques can reduce the program time to program dummy data, and reduce the read time to identify dummy data. For another example, by programming dummy data in a faster way, power-loss protection operations can be more efficient, which can enhance data retention of the memory device. In addition, by identifying dummy data in a faster way, garbage collection operations can be more efficient. In some implementations, additional or different technical effects can be achieved.

Figure 1:
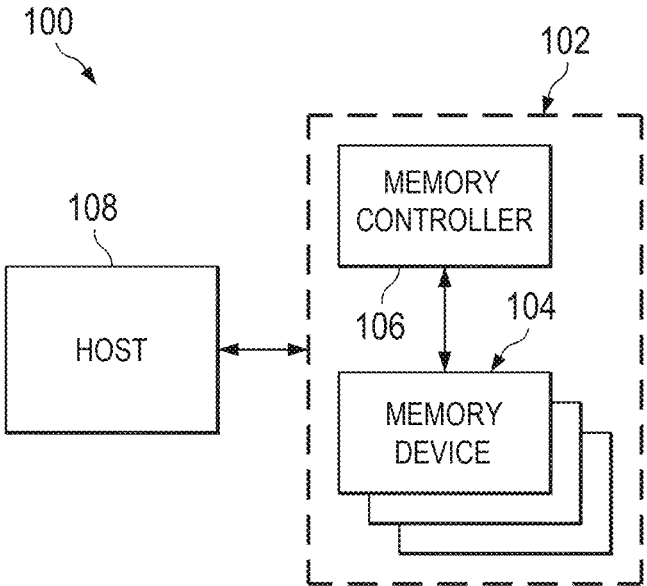
FIG. 1 illustrates a block diagram of an example system having a memory device, according to some aspects of the present disclosure.

FIG. 1 illustrates a block diagram of an example system 100 having a memory device, according to some aspects of the present disclosure. The system 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, the system 100 can include a host 108 and a memory system 102 having one or more memory devices 104 and a memory controller 106. The host 108 can include one or more processors of an electronic device. The processor can be a central processing unit (CPU), or a system-on-chip (SoC), such as an application processor (AP). The host 108 can be configured to send or receive data and commands to or from the memory systems 102.

The memory device 104 can be any memory device disclosed in the present disclosure, such as a NAND Flash memory device. It is noted that the NAND Flash is only one example of memory device for illustrative purposes. It can include any suitable solid-state, non-volatile memory, e.g., NOR Flash, Ferroelectric RAM (FeRAM), Phase-change memory (PCM), Magne-to-resistive random-access memory (MRAM), Spin-transfer torque magnetic random-access memory (STT-RAM), or Resistive random-access memory (RRAM), etc. In some implementations, memory device 104 includes a three-dimensional (3D) NAND Flash memory device.

The memory controller 106 can be implemented by microprocessors, microcontrollers (a.k.a. microcontroller units (MCUs)), digital signal processors (DSPs), application-specific integrated circuits (ASICs), field-programmable gate arrays (FPGAs), programmable logic devices (PLDs), state machines, gated logic, discrete hardware circuits, and other suitable hardware, firmware, and/or software configured to perform the various functions described below in detail.

The memory controller 106 is coupled to the memory device 104 and to the host 108, and is configured to control the memory device 104, according to some implementations. The memory controller 106 can manage the data stored in the memory device 104 and can communicate with the host 108. In some implementations, the memory controller 106 is designed for operating in a low duty-cycle environment, such as secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state drives (SSDs) or embedded multi-media-cards (eMMCs) used as data storage for mobile devices, such as smartphones, tablets, laptop computers, etc., and enterprise storage arrays. The memory controller 106 can be configured to control operations of the memory device 104, such as read, erase, and program operations. The memory controller 106 can also be configured to manage various functions with respect to the data stored or to be stored in the memory device 104 including, but not limited to bad-block management, garbage collection, logical-to-physical address conversion, logical-to-physical mapping management, wear leveling, etc. In some implementations, the memory controller 106 is further configured to process error correction codes (ECCs) with respect to the data read from or written to the memory device 104. Any other suitable functions can be performed by the memory controller 106 as well, for example, formatting the memory device 104.

The memory controller 106 can communicate with an external device (e.g., the host 108) according to a particular communication protocol. For example, the memory controller 106 can communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. The memory controller 106 is configured to receive and transmit a command to and from the host 108, and execute or perform multiple functions and operations provided in the present disclosure, which will be described later.

Figure 2A:
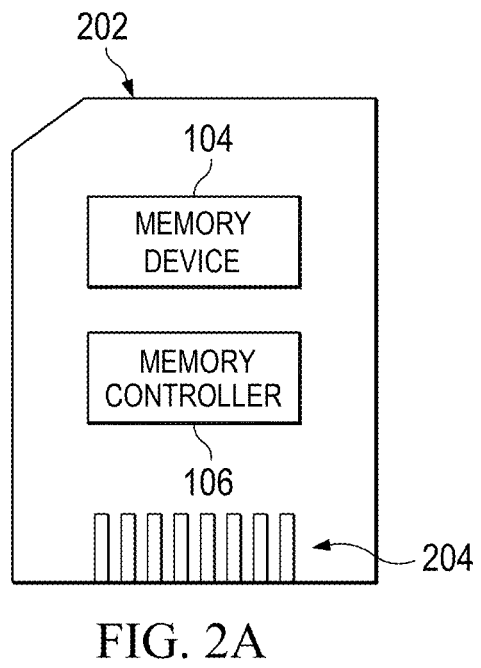
FIGS. 2A-2B illustrate example storage products, according to some aspects of the present disclosure.
Figure 2B:
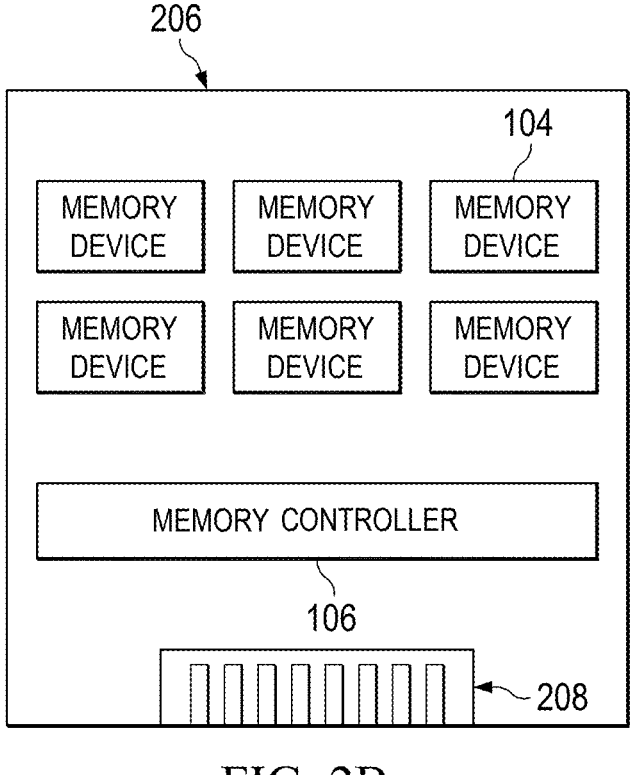

The memory controller 106 and the one or more memory devices 104 can be integrated into various types of storage devices. For example, the memory controller 106 and the one or more memory devices 104 can be packaged in a universal Flash storage (UFS) package or an eMMC package. In one example as shown in FIG. 2A, the memory controller 106 and a single memory device 104 can be integrated into a memory card 202. The memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 can further include a memory card connector 204 coupling the memory card 202 with a host (e.g., host 108 in FIG. 1). In another example as shown in FIG. 2B, the memory controller 106 and multiple memory devices 104 can be integrated into an SSD 206. The SSD 206 can further include an SSD connector 208 that couples the SSD 206 with a host (e.g., host 108 in FIG. 1). In some implementations, the storage capacity and/or the operation speed of the SSD 206 is greater than those of the memory card 202.

Figure 3:
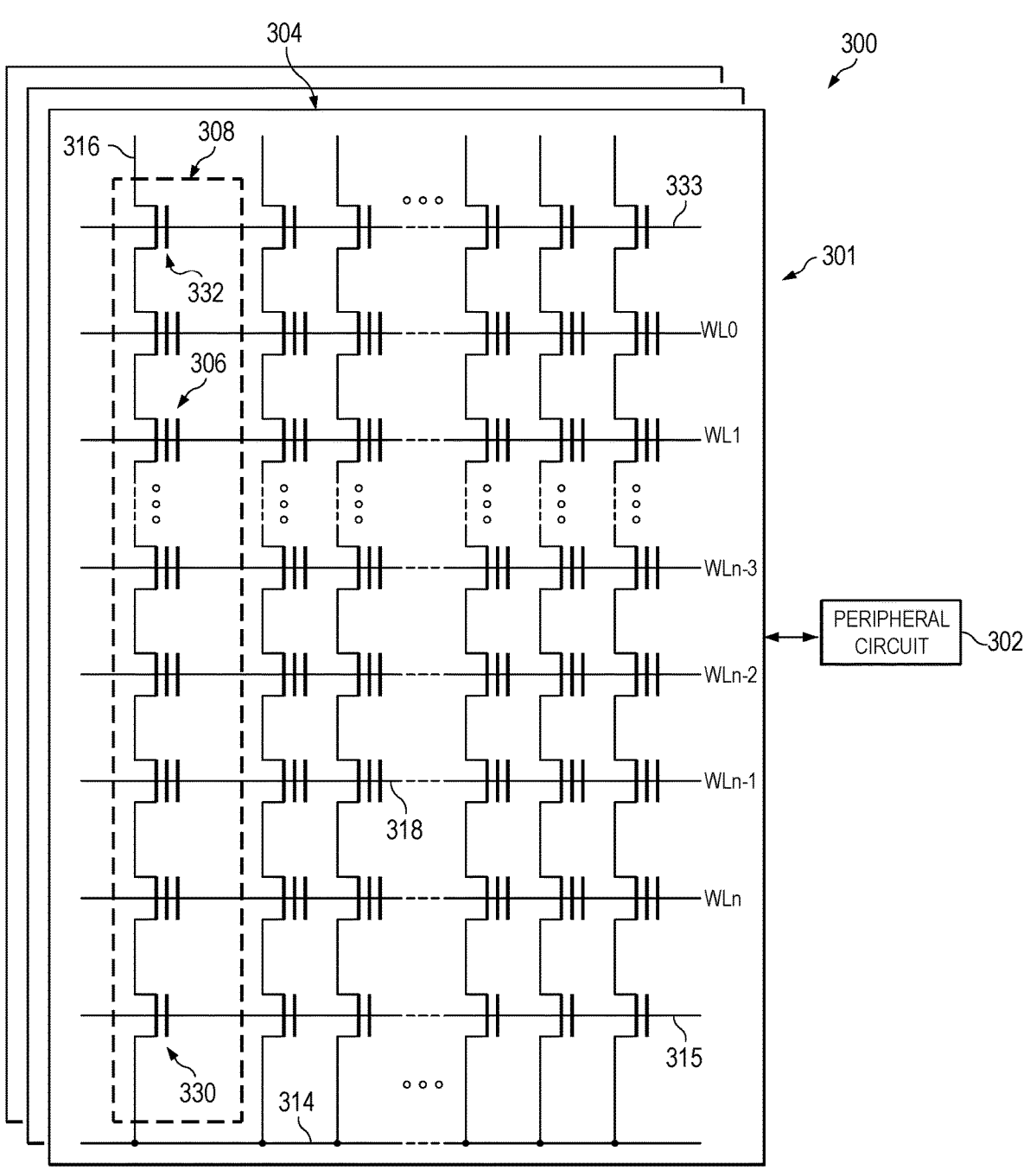
FIG. 3 illustrates an example of a schematic diagram of a memory device including peripheral circuits, according to some aspects of the present disclosure.

FIG. 3 illustrates an example of a schematic circuit diagram of a memory device 300 including peripheral circuits, according to some aspects of the present disclosure. The memory device 300 can include a memory cell array 301 and peripheral circuits 302 coupled to the memory cell array 301. The memory cell array 301 can be a NAND Flash memory cell array in which memory cells 306 are provided in the form of an array of NAND memory strings 308 each extending vertically above a substrate (not shown in FIG. 3). In some implementations, each NAND memory string 308 includes a plurality of memory cells 306 coupled in series and stacked vertically. Each memory cell 306 can hold a continuous, analog value, such as an electrical voltage or charge that depends on the number of electrons trapped within a storage layer of the memory cell 306. The logic state (i.e., data) of each memory cell 306 in the memory block 304 can be determined based on the threshold voltage of the memory cell 306. Each memory cell 306 can be a floating gate type memory cell including a floating-gate transistor, or a charge trap type memory cell including a charge-trap transistor.

In some implementations, each memory cell 306 is a single-level cell (SLC) with two possible memory states that can store one bit of data. For example, the first memory state "0" can correspond to a first range of voltages, and the second memory state "1" can correspond to a second range of voltages. In some implementations, each memory cell 306 is a multi-level cell (MLC) that is capable of storing more than one bit of data in more than two memory states. For example, the MLC can store two bits per cell, three bits per cell (also known as triple-level cell (TLC)), or four bits per cell (also known as quad-level cell (QLC)). Each MLC can be programmed to support a range of possible nominal storage values. In one example, if each MLC stores two bits of data, then the MLC can be programmed to one of three possible programming levels from an erased state by writing one of three possible nominal storage values to the cell. A fourth nominal storage value can be used for the erased state.

As shown in FIG. 3, each NAND memory string 308 can include a source select gate (SSG) 310 at its source end and a drain select gate (DSG) 312 at its drain end. The SSG 310 and the DSG 312 can be configured to activate selected NAND memory strings 308 (columns of the array) during read and program operations. In some implementations, the sources of NAND memory strings 308 in the same memory block 304 are coupled through a same source line (SL) 314, e.g., a common SL. In other words, NAND memory strings 308 in the same memory block 304 have an array common source (ACS), according to some implementations. The DSG 312 of each NAND memory string 308 is coupled to a respective bit line 316 from which data can be read or written via an output bus (not shown), according to some implementations. In some implementations, each NAND memory string 308 is configured to be selected or deselected by applying a select voltage (e.g., above the threshold voltage of the transistor having the DSG 312) or a deselect voltage (e.g., 0 V) to the respective DSG 312 through one or more DSG lines 313, and/or by applying a select voltage (e.g., above the threshold voltage of the transistor having the SSG 310) or a deselect voltage (e.g., 0 V) to the respective SSG 310 through one or more SSG lines 315.

As shown in FIG. 3, NAND memory strings 308 can be organized into multiple memory blocks 304, each of which can have a common source line 314 coupled to the ACS. In some implementations, each memory block 304 can serve as a basic data unit for erase operations, such that memory cells 306 on the same memory block 304 are erased at the same time. To erase memory cells 306 in a selected block 304, the source lines 314 coupled to the selected memory block 304 and unselected blocks in the same plane can be biased with an erase voltage. For example, the erase voltage can be a high positive voltage (e.g., 20 V or more). In some implementations, an erase operation can be performed at a half-block level, a quarter-block level, or a level having any suitable number of blocks or fractions of a block.

The memory cells 306 of adjacent NAND memory strings 308 can be coupled through word lines 318. The word line 318 can select which row of memory cells 306 is affected by read and program operations. In some implementations, the memory cell 306 is a SLC, and each word line 318 correspond to one memory page. A memory page is the basic data unit for program operations. If the memory cell 306 is an MLC that stores two bits of data per cell, each word line 318 can correspond to two memory pages. If memory cell 306 is a TLC, each word line 318 can correspond to three memory pages, including a lower page, a middle page, and an upper page. If memory cell 306 is a QLC, each word line 318 can correspond to four memory pages, including a lower page, a middle page, an upper page, and an extra page. The memory page refers to a logic page in the present disclosure. The size of a memory page in bits is associated with the number of NAND memory strings 308 coupled by word line 318 in a memory block 304. Each word line 318 can include a gate line coupled to a plurality of control gates (gate electrodes) of a plurality of memory cells 306 in the respective memory page. Example word lines shown in FIG. 3 include WL0, WL1, . . . , WLn–3, WLn–2, WLn–1, and WLn that are between one or more DSG lines 313 and one or more SSG lines 315.

Figure 4:
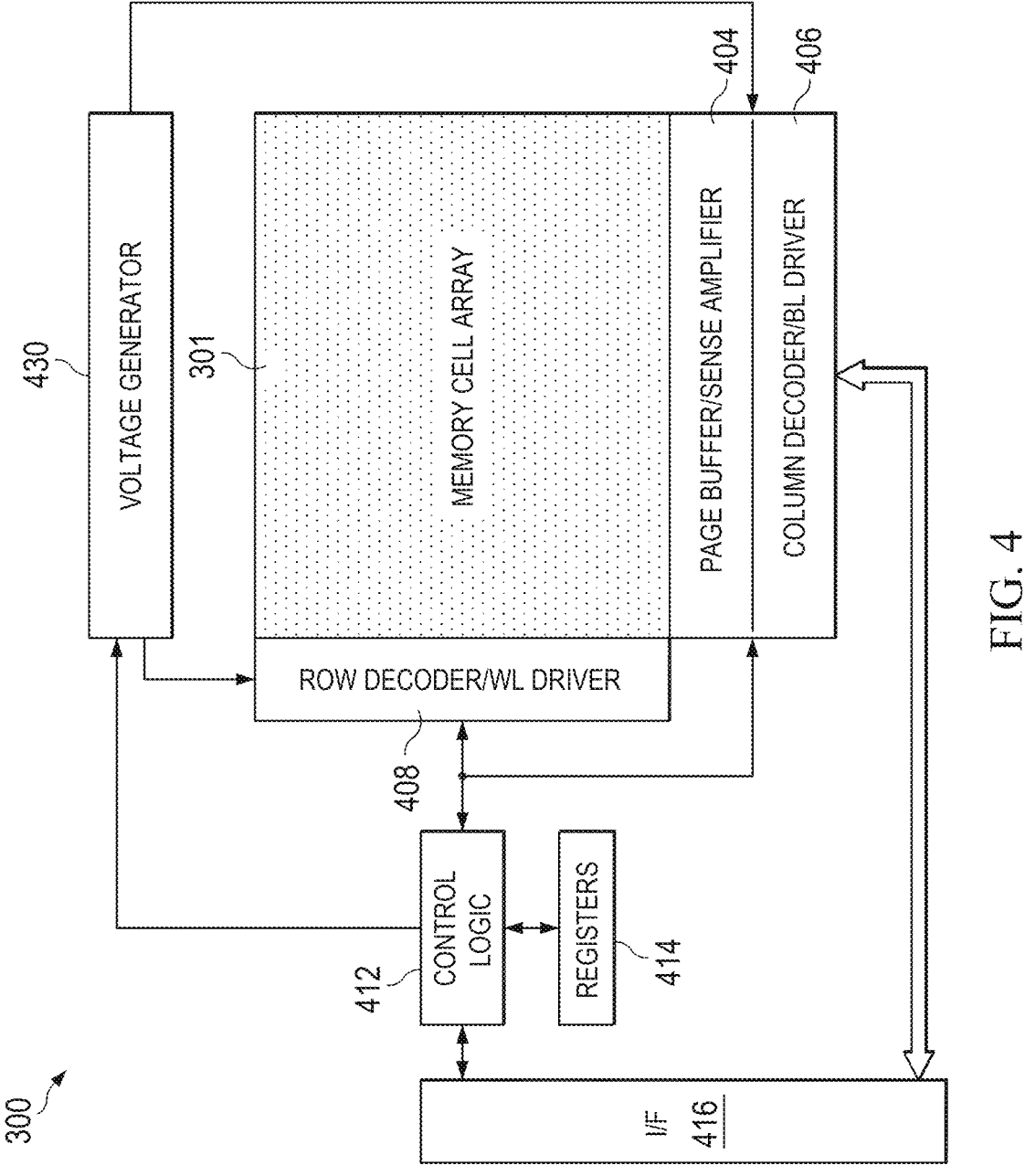
FIG. 4 illustrates some example peripheral circuits, according to some aspects of the present disclosure.

FIG. 4 illustrates some example peripheral circuits 302, according to some aspects of the present disclosure. The peripheral circuits 302 can be coupled to the memory cell array 301 through bit lines 316, word lines 318, SLs 314, SSG lines 315, and DSG lines 313. The peripheral circuits 302 can include any suitable analog, digital, and mixed-signal circuits for facilitating the operations of the memory cell array 301 by applying and sensing voltage signals and/or current signals to and from each target memory cell 306 through bit lines 316, word lines 318, SLs 314, SSG lines 315, and DSG lines 313. The peripheral circuits 302 can include various types of peripheral circuits formed using metal-oxide-semiconductor (MOS) technologies. The example peripheral circuits 302 include a page buffer/sense amplifier 404, a column decoder/bit line driver 406, a row decoder/word line driver 408, a voltage generator 410, control logic 412, registers 414, an interface 416, and a data bus. In some examples, additional peripheral circuits not shown in FIG. 4 may be included as well.

The page buffer/sense amplifier 404 can be configured to read and program (write) data from and to memory cell array 301 according to the control signals from control logic 412. In an example, the page buffer/sense amplifier 404 may store one page of program data (write data) to be programmed into one page of the memory cell array 301. In another example, the page buffer/sense amplifier 404 may perform program verify operations to ensure that the data have been properly programmed into memory cells 306 coupled to selected word lines 418. In still another example, the page buffer/sense amplifier 404 may also sense the low power signals from the bit line 316 that represents a data bit stored in memory cell 306, and amplify the small voltage swing to recognizable logic levels in a read operation. The column decoder/bit line driver 406 can be configured to be controlled by the control logic 412 and select one or more NAND memory strings 308 by applying bit line voltages generated from the voltage generator 410.

The row decoder/word line driver 408 can be configured to be controlled by the control logic 412 and select/deselect memory blocks 304 of the memory cell array 301 and select/deselect word lines 418 of the memory block 304. The row decoder/word line driver 408 can be further configured to drive word lines 418 using word line voltages generated from the voltage generator 410. In some implementations, the row decoder/word line driver 408 can also select/deselect and drive SSG lines 315 and DSG lines 313. As described below in detail, the row decoder/word line driver 408 is configured to apply a program voltage to selected word line 418 in a program operation on memory cell 306 coupled to selected word line 418.

The voltage generator 410 can be configured to be controlled by the control logic 412 and generate the word line voltages (e.g., read voltage, program voltage, pass voltage, local voltage, verify voltage, etc.), bit line voltages, and source line voltages to be supplied to the memory cell array 301.

The control logic 412 can be coupled to each peripheral circuit described above and configured to control operations of each peripheral circuit. The registers 414 can be coupled to the control logic 412 and include status registers, command registers, and address registers for storing status information, command operation codes (OP codes), and command addresses for controlling the operations of each peripheral circuit.

The interface 416 can be coupled to the control logic 412 and act as a control buffer to buffer and relay control commands received from a host (not shown) to the control logic 412 and status information received from the control logic 412 to the host. The interface 416 can also be coupled to the column decoder/bit line driver 406 via a data bus, and act as a data input/output (I/O) interface and a data buffer to buffer and relay data to and from the memory cell array 301.

Figure 5A:
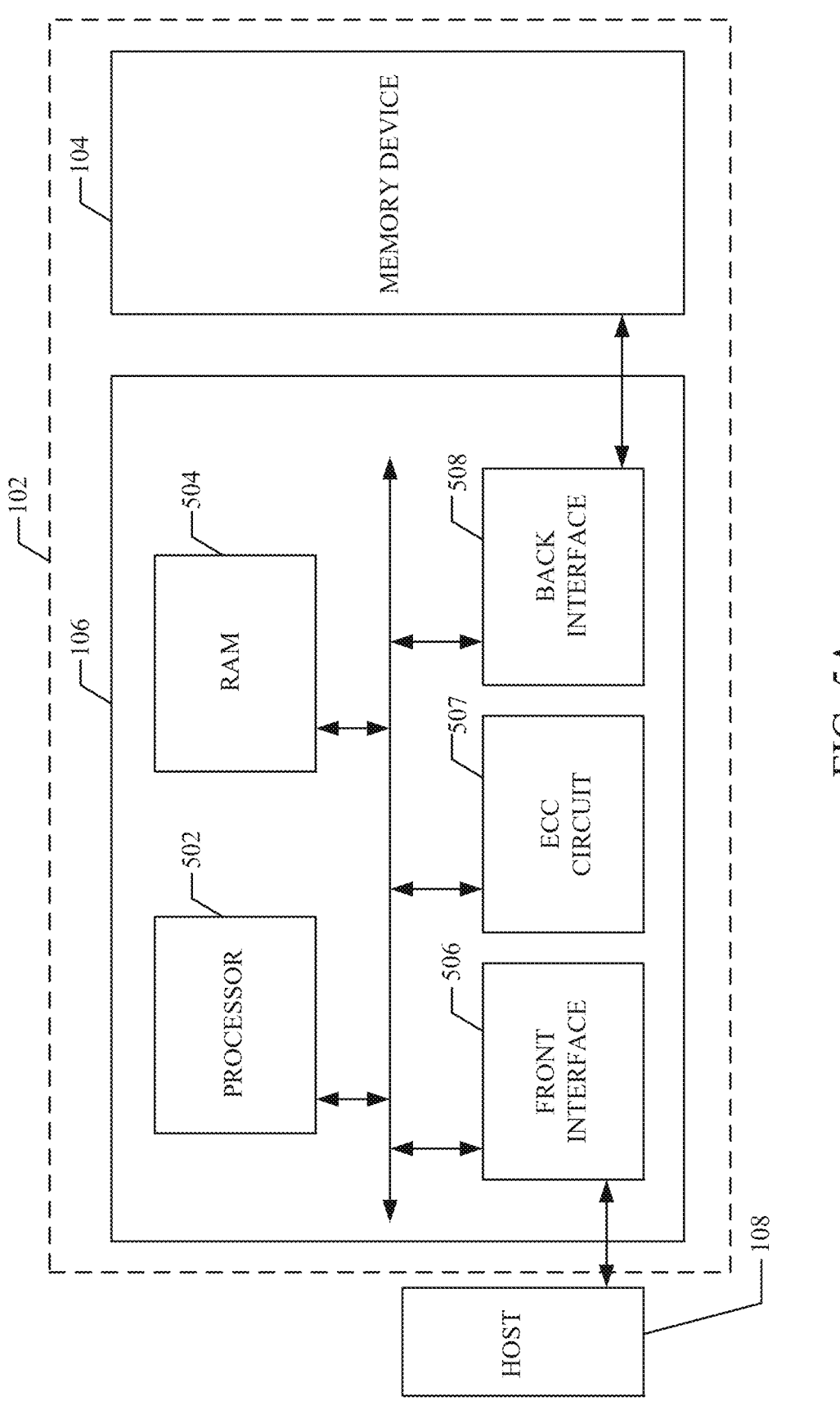
FIG. 5A illustrates a block diagram of an example memory system including a memory controller, according to some aspects of the present disclosure.

FIG. 5A is a block diagram of an example memory system 102 including a memory controller 106, according to some aspects of the present disclosure. The memory system 102 further includes a memory device 104. The memory system 102 can be coupled to a host 108.

The memory controller 106 is configured to operate the memory device 104 at the request of the host 108. The memory controller 106 is configured to drive firmware for controlling the operations of the memory device 104. The memory controller 106 can include a random access memory (RAM) 504, one or more processors 502, a front interface 506, an error-correction code (ECC) circuit 507, and a back interface 508.

The memory controller 106 is configured to communicate with the host 108 through the front interface 506. For example, the memory controller 106 can receive commands from the host 108 and send responses to the host 108 through the front interface 506. The memory controller 106 is configured to communicate with the memory device 104 through the back interface 508. For example, the memory controller 106 can send commands to the memory device 104 and receive responses from the memory device 104 through the back interface 508. The back interface 508 may include a NAND flash interface or a NOR flash interface.

The ECC circuit 507 is configured to process error correction codes with respect to the data read from or written to the memory device 104. Example error correction codes can include, but are not limited to, Hamming codes, Reed-Solomon codes, low-density parity check (LDPC) codes, etc. In some implementations, the ECC circuit 507 includes an LPDC encoder configured to generate parity data based on LDPC codes for user data received from the host 108, so that both the user data and the parity data can be sent to the memory device 104 for storage. The ECC circuit 507 can further include an LDPC decoder configured to decode data comprising the user data and the parity data. The ECC circuit can determine whether data stored in the block is read successfully (e.g., with no errors). If the data stored in the block is read successfully, the back interface 508 can forward the data to the front interface 506, so that the front interface 506 can return the data to the host 108. However, if the data stored in the memory block is not read successfully, the back interface 508 can generate data describing a read error on the memory block.

The RAM 504 is configured to be used as an operation memory of the one or more processors 502, a cache memory between the memory device 104 and the host 108, and/or a buffer memory between the memory device 104 and the host 108.

The one or more processors 502 are configured to control operations of the memory controller 106. The one or more processors 502 are configured to control a read operation, a program operation, an erase operation, or other operations of the memory device 104. In some implementations, the one or more processors 502 can function a flash translation layer (FTL) 510. The one or more processors 502 can further function as a frontend configured to handle communications between the host 108 and the memory controller 106, and a backend configured to handle communications between the memory controller 106 and the memory device 104.

Figure 5B:
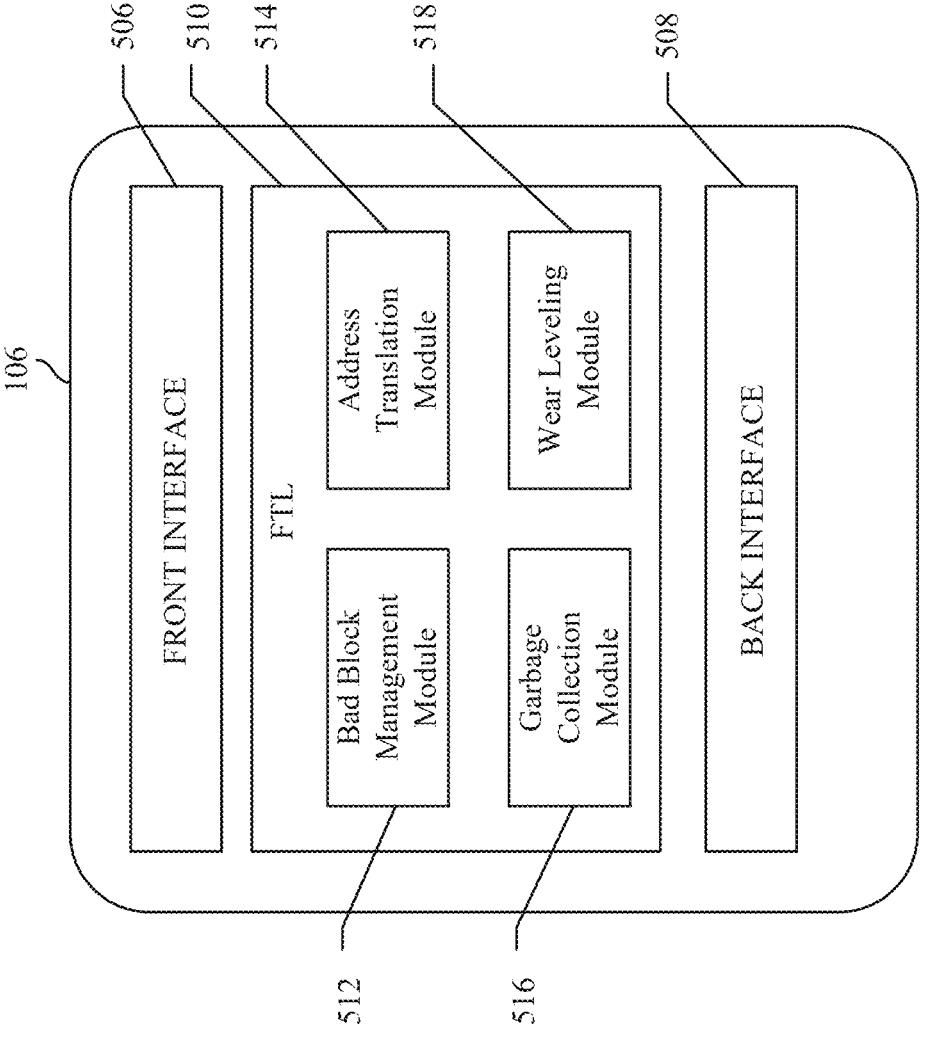
FIG. 5B illustrates a block diagram of an example memory controller, according to some aspects of the present disclosure.

As shown in FIG. 5B, the FTL 510 can include a bad block management module 512, an address translation module 514, a garbage collection (GC) module 516, and a wear leveling module 518. In some implementations, the FTL 510 can include other modules not shown in FIG. 5B.

The bad block management module 512 can be configured to identify failed memory blocks (e.g., by maintaining a bad block table) in the memory device 104. In some implementations, a memory block (e.g., memory block 304 of FIG. 3) may fail due to various factors including manufacturing defects, wear from repeated use, or physical damage. A failed memory block can be skipped or replaced in read or program operations to prevent data corruption.

The address translation module 514 can be configured to translate or map logical data blocks (e.g., received from the host 108) to physical spaces in the memory device 104. In some implementations, the address translation module 514 can translate a logical block address (LBA) provided by the host 108 into a physical block address (PBA) based on a logical to physical (L2P) mapping table. There may be various address mapping methods for the address translation module 514. Examples of address mapping methods include a page mapping method, a block mapping method, and a hybrid mapping method.

The GC module 516 can be configured to migrate data from a source memory block to a target memory block, so that the source memory block can be erased to be available for writing new data. For example, the GC module 516 can be configured to select a source memory block and a target memory block in the memory device 104, read valid data from the source memory block by sending read commands to the memory device 104, write the valid data to the target memory block by sending write commands to the memory device 104, and then erase the source memory block. In some implementations, the GC module 516 can be configured to perform foreground garbage collection on the memory device 104, where the garbage collection is performed when there are not enough memory blocks available for writing new data. In some implementations, the GC module 516 can perform background garbage collection on the memory device 104, where the garbage collection is performed while the memory device is idle (e.g., when there is no pending command to be executed by the memory device).

In some implementations, the GC module 516 performs garbage collection on the memory device 104 based on priority levels of memory blocks in the memory device 104. The priority level can be determined based on valid page count (VPC) of the memory blocks, erase/program (P/E) cycles that the memory blocks have undergone, and/or other metrics. For example, the garbage collection can migrate data from a first memory block having a smaller VPC (which indicates the first memory block has more invalid data) and erases the first memory block, before migrating data from a second memory block having a greater VPC and erasing the second memory block.

The wear leveling module 518 can be configured to balance P/E cycles across memory blocks. For example, the wear leveling module 518 can track the P/E cycle count of each memory block, and write new data to the least-used memory block first. For another example, the wear leveling module 518 can move cold data (data that are not frequently accessed) to another memory block to ensure that different memory blocks wear out at similar rates.

Figures 6A, 6B:
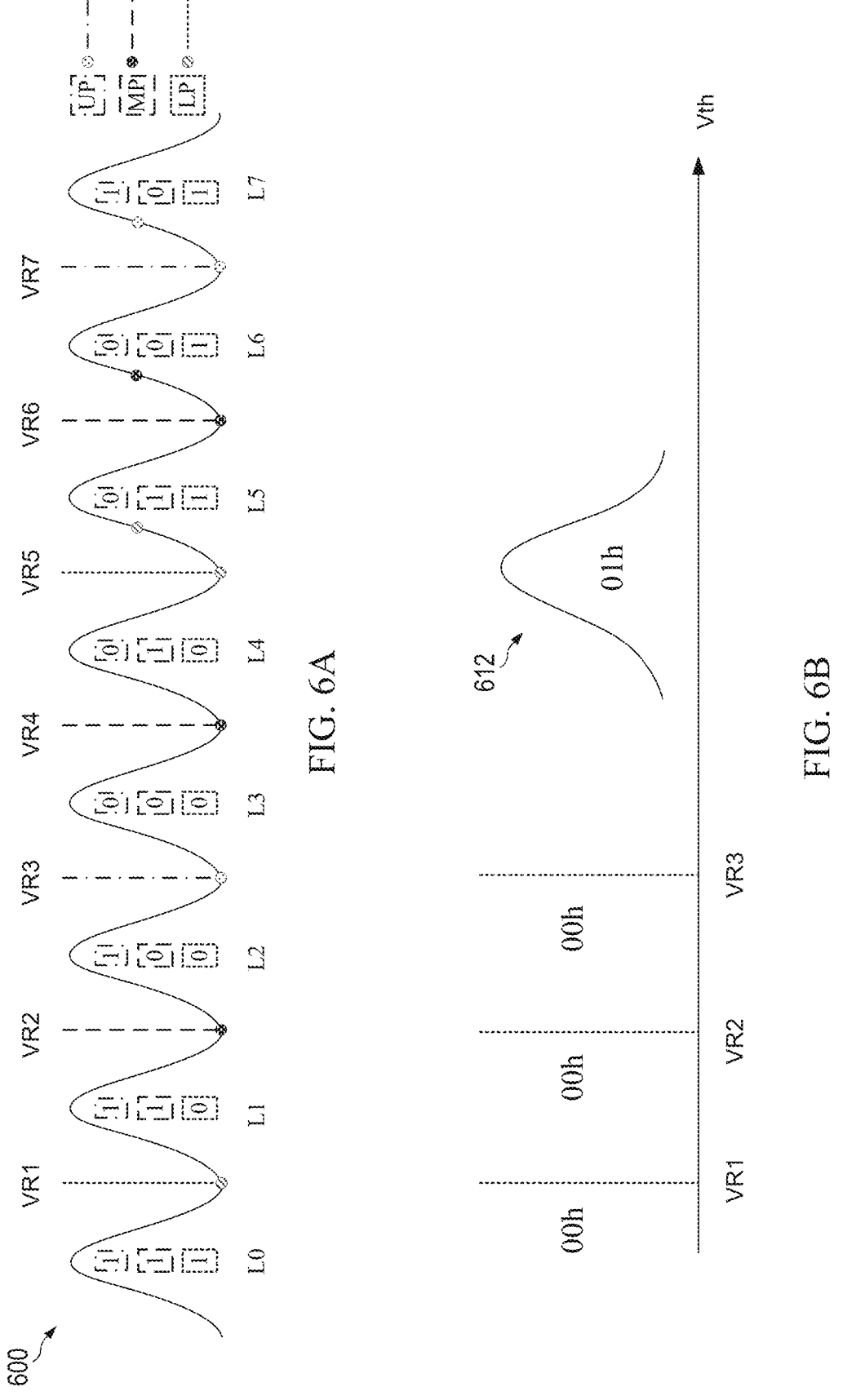
FIG. 6A illustrates an example of a threshold voltage distribution of memory cells in a triple-level cell (TLC) memory device, according to some aspects of the present disclosure.
FIG. 6B illustrates a schematic diagram of an example threshold voltage distribution of memory cells associated with a zero page in a TLC memory device, according to some aspects of the present disclosure.

FIG. 6A illustrates an example of a threshold voltage distribution 600 of memory cells in a triple-level cell (TLC) memory device, according to some aspects of the present disclosure. Each memory cell of the TLC memory device (also referred to as triple-level cell or TLC) can be configured to be set as one of eight states L0-L7, where L0 is the erased state and L1-L7 are programmed states. Each state of the TLC corresponds to a range of threshold voltages $V_{th}$, where the $V_{th}$ distribution of each state can be represented by a probability density. As shown in FIG. 6A, from the state L0 to the state L7, $V_{th}$ of the memory cells increases. In some implementations, each state of the TLC can be programmed by using an incremental step pulse programming (ISPP) scheme, where the program voltage applied to the selected word line can be incrementally increased by adding a step pulse. For example, the eight states of TLC can be programmed, from the erase state L0 to the programmed state L1 having a lower threshold voltage, and then to programmed state L2, L3, . . . . L7 having a higher threshold voltage.

The states of a memory cell can be mapped into data in the form of binary codes. For example, the eight states of a TLC can be represented in the form of a Gray code. A Gray code, also referred to as reflected binary code (RBC) or reflected binary (RB), is an ordering of the binary numeral system such that two successive values differ in only one bit (binary digit). Using Gray codes allows for easier error correction in programming and reading operations, since the codes of any adjacent states differ by only one binary digit.

As shown in FIG. 6A, each state of the TLC is mapped into a 3-bit binary code. As an example, the eight states (states L0-L7) of TLC can correspond to 3-bit binary codes (111), (110), (100), (000), (010), (011), (001) and (101), respectively. The 3 bits of the binary codes can be named as a most significant bit (MSB), a center significant bit (CSB), and a least significant bit (LSB), reading from left to right.

For example, the state P5 can be mapped to the binary code (011), where the MSB, CSB and LSB are "0", "1," and "1," respectively. In some implementations, the memory cells coupled to the same word line (e.g., word line 318 of FIG. 3) can be read or programmed simultaneously. Memory cells coupled to the same word line (also referred to as a physical page) can store data in three logic pages, including a lower page (LP), a middle page (MP), and an upper page (UP). The memory device can program data into the memory cells according to the LSB, CSB and MSB of the binary codes.

It should be noted that the mapping relationship between states of a memory cell and the gray codes as shown in FIG. 6A is for illustrative purposes. The states of the memory cell can be mapped to the gray codes in a different order, or can be mapped to a different set of binary codes.

During a read operation, the state of a memory cell can be determined by comparing the threshold voltage ($V_{th}$) of the memory cell with one or more read voltages VR (e.g., VR1, VR2, . . . ). A read voltage VR can be within a read margin between two adjacent states, i.e., between a highest possible Vin of a lower state and a lowest possible $V_{th}$ of a higher state. As shown in FIG. 6A, in the TLC memory device, by applying the read voltages VR1-VR7 to the selected word line, the memory device can determine a range of $V_{th}$ of a target memory cell coupled to the selected word line. As an example, to verify if the target memory cell is at state L0, the memory device can apply the read voltage VR1 to the word line. If the target memory cell is at state L0, $V_{th}$ of the target memory cell is lower than VR1, the target memory cell is therefore switched on to form a conductive path in the channel. If the target memory cell is at any one of the states L1-L7, $V_{th}$ of the target memory cell is higher than VR1, the target memory cell is therefore switched off. By measuring or sensing the current through the target memory cell or sensing a voltage drop at the corresponding bit line, the memory device can determine $V_{th}$ or the state of the target memory cell.

In some implementations, the states of the memory cells are read and determined according to the logic pages of the mapping scheme. For example, in a TLC memory device, a first set of the read voltages, e.g., VR3 and VR7, can be used to determine the MSB of the target memory cell (corresponding to the upper page) where "1" is flipped to "0" or "0" is flipped to "1". Similarly, a second set of the read voltages, e.g., VR2, VR4 and VR6, can be used to determine the CSB of the target memory cell (corresponding to the middle page), and a third set of the read voltages, e.g., VR1 and VR5, can be used to determine the LSB of the target memory cell (corresponding to the lower page). Accordingly, data can be read from the upper page (UP) by applying two read voltages to the selected word line. Data can be read from the middle page (MP) by applying three read voltages to the selected word line. Data can be read from the lower page (LP) by applying two read voltages to the selected word line.

FIG. 6B illustrates a schematic diagram of an example threshold voltage distribution of memory cells associated with a zero page in a TLC memory device, according to some aspects of the present disclosure. A zero page does not include valid data, and includes only zeros (also referred to as dummy data).

As shown in FIG. 6B, to program a zero page, memory cells coupled to a selected word line can be programmed to a target state 612. $V_{th}$ of memory cells in the target state 612 is higher than (to the right of) starting read voltages for reading each of the lower page (starting read voltage being VR1), middle page (starting read voltage being VR2), and upper page (starting read voltage being VR3). That is, Vin of memory cells in the target state 612 is higher than VR3. For example, $V_{th}$ of the target state 612 can be the same as $V_{th}$ of programmed state L3, or the same as $V_{th}$ of programmed state L4, or between $V_{th}$ of programmed state LA and $V_{th}$ of programmed state L5.

In some implementations, the memory device can program all memory cells coupled to the selected word line to the target state 612 by applying a single program pulse to the selected word line (e.g., in an SLC mode). In some implementations, the memory device can program all memory cells coupled to the selected word line to the target state 612 by applying more than one program pulse to the selected word line, for example, some of the program pulses of an ISPP scheme (e.g., in a TLC mode).

The threshold voltage of target state 612 can be pre-determined based on the Gray codes. In some implementations, the threshold voltage of target state 612 is higher than the read voltage corresponding to the programmed state where each bit of the three-bit binary code flips for the first time. For example, referring back to FIG. 6A, LSB of the three-bit binary code flips for the first time at L1, CSB of the three-bit binary code flips for the first time at L2, and MSB of the three-bit binary code flips for the first time at L3. As such, the threshold voltage of target state 612 can be pre-determined to be higher than the read voltage VR3, which corresponds to L3. It should be noted that the $V_{th}$ of target state 612 can be pre-determined differently if the eight states are mapped to a different set of Gray codes.

As shown in FIG. 6B, the memory device can determine whether the memory cells are in the target state 612 by applying a single read voltage. By applying a starting read voltage of one of the memory pages (that is, VR1 for the lower page, VR2 for the middle page, or VR3 for the upper page) to the selected word line, the majority of the memory cells coupled to the selected word line have $V_{th}$ higher than the starting read voltage and are thereby switched off. Only a few memory cells coupled to the selected word line have $V_{th}$ lower than the starting read voltage and are thereby switched on (e.g., due to probability density). In comparison, in the $V_{th}$ distribution 600 of FIG. 6A, a substantial amount of memory cells (e.g., memory cells in state L0) have $V_{th}$ lower than the starting read voltage. As such, the memory device can determine whether the page being read is a zero page by applying the starting read voltage.

For example, the memory device can determine a quantity of the failed memory cells (that is, memory cells having $V_{th}$ lower than the read voltage) corresponding to the starting read voltage, and compare the quantity of failed memory cells to a threshold. The threshold can be set as a value that is lower than ⅛ of the quantity of memory cells coupled to the selected word line in a TLC memory device, for example, 10% or 5% of the quantity of memory cells coupled to the selected word line, or any other suitable value. If the quantity of failed memory cells is less than the threshold, it indicates that the memory page being read is a zero page. In such case, the memory device can end the read operation, and send a response (e.g., returning status E1h) to a memory controller to indicate that the memory page is a zero page, without sending data in the zero page to the memory controller. If the quantity of failed memory cells is greater than or equal to the threshold, it indicates that the memory page is not a zero page, and the memory device can proceed with the read operation by applying subsequent read voltages to read data from the memory page.

In some implementations, the memory device can identify zero pages by applying fewer read voltages than a read operation to read data from the memory page, which can reduce the read time needed for identifying zero pages. For example, the memory device can determine whether a memory page is a zero page by applying a single read voltage (e.g., a starting read voltage of a set of read voltages for reading data from the memory page). For another example, the memory device can determine whether a memory page is a zero page by applying more than one program pulses (e.g., a portion of the set of the read voltages for reading data from the memory page).

FIG. 7A illustrates an example of threshold voltage distributions of memory cells in a quad-level cell (QLC) memory device, according to some aspects of the present disclosure.

Each memory cell of the QLC memory device (also referred to as quad-level cell or QLC) can be configured to be set as one of 16 states L0-L15, where L0 is the erased state and L1-L15 are programmed states. Each state of the QLC corresponds to a range of threshold voltages $V_{th}$, where the $V_{th}$ distribution of each state can be represented by a probability density. As shown in FIG. 7A, from the state L0 to the state L15, $V_{th}$ of the memory cell increases. In some implementations, each state of the QLC can be programmed by using an incremental step pulse programming (ISPP) scheme, where the program voltage applied to the selected word line can be incrementally increased by adding a step pulse. For example, the 16 states of QLC can be programmed, from the erase state L0 to the programmed state L1 having a lower threshold voltage, and then to programmed state L2, L3, . . . , L15 having a higher threshold voltage.

The states of a memory cell can be mapped into data in the form of binary codes. For example, the 16 states of a QLC can be represented in the form of a Gray code. As shown in FIG. 7A, each state of the QLC is mapped into a 4-bit binary code. As an example, the 16 states (states L0-L15) of QLC can correspond to 4-bit binary codes (1111), (0111), (0110), (0100), (1100), (1000), (0000), (0010), (0011), (0001), (0101), (1101), (1001), (1011), (1010) and (1110), respectively. Memory cells coupled to the same word line (also referred to as a physical page) can store data in four logic pages, including a lower page (LP), a middle page (MP), an upper page (UP), and an extra page (XP). In some implementations, the states of the memory cell can be mapped to the gray codes in a different order, or can be mapped to a different set of binary codes.

During a read operation, the state of a memory cell can be determined by comparing the threshold voltage ($V_{th}$) of the memory cell with one or more read voltages VR (e.g., VR1, VR2, . . . ). As shown in FIG. 7A, in the QLC memory device, by applying the read voltages VR1-VR15 to the selected word line, the memory device can determine a range of $V_{th}$ of a target memory cell coupled to the selected word line. By measuring or sensing the current through the target memory cell or sensing a voltage drop at the corresponding bit line, the memory device can determine $V_{th}$ or the state of the target memory cell.

In some implementations, the states of the memory cells are read and determined according to the logic pages of the mapping scheme. For example, in a QLC memory device, a first set of the read voltages, e.g., VR1, VR4, VR6, and VR11, can be used to determine the most significant bit of the target memory cell (corresponding to the extra page) where "1" is flipped to "O" or "0" is flipped to "1". Similarly, a second set of the read voltages, e.g., VR5, VR10, VR12, and VR15, can be used to determine the second most significant bit of the target memory cell (corresponding to the upper page), a third set of the read voltages, e.g., VR3, VR7, VR9, and VR13, can be used to determine the third most significant bit of the target memory cell (corresponding to the middle page), and a fourth set of read voltages, e.g., VR2, VR8 and VR14, can be used to determine the least significant bit of the target memory cell (corresponding to the lower page). Accordingly, the data can be read from the extra page (XP) by applying four read voltages to the selected word line. Data can be read from the upper page (UP) by applying four read voltages to the selected word line. Data can be read from the middle page (MP) by applying four read voltages to the selected word line. Data can be read from the lower page (LP) by applying three read voltages to the selected word line.

FIG. 7B illustrates a schematic diagram of an example threshold voltage distribution of memory cells associated with a zero page in a QLC memory device, according to some aspects of the present disclosure.

As shown in FIG. 7B, to program a zero page, memory cells coupled to a selected word line can be programmed to a target state 712. $V_{th}$ of memory cells in the target state 712 is higher than (to the right of) a starting read voltage for reading each of the lower page (starting read voltage being VR2), the middle page (starting read voltage being VR3), the upper page (starting read voltage being VR5) and the extra page (starting read voltage being VR1). That is, Vin of the target state 712 is higher than VR5. For example, $V_{th}$ of the target state 712 can be the same as $V_{th}$ of programmed state L6, or the same as $V_{th}$ of programmed state L7, or between $V_{th}$ of programmed state L7 and Vin of programmed state L8.

In some implementations, the memory device can program all memory cells coupled to the selected word line to the target state 712 by applying a single program pulse to the selected word line (e.g., in an SLC mode). In some implementations, the memory device can program all memory cells coupled to the selected word line to the target state 712 by applying more than one program pulse to the selected word line, for example, some of the program pulses of an ISPP scheme (e.g., in a QLC mode).

The threshold voltage of target state 712 can be pre-determined based on the Gray codes. In some implementations, the threshold voltage of target state 712 is higher than the read voltage corresponding to the programmed state where each bit of the 4-bit binary code flips for the first time. For example, referring back to FIG. 7A, the least significant bit of the 4-bit binary code flips for the first time at L2, the third most significant bit of the 4-bit binary code flips for the first time at L3, the second most significant bit of the 4-bit binary code flips for the first time at L5, and the most significant bit of the 4-bit binary code flips for the first time at L1. As such, the threshold voltage of target state 712 can be pre-determined to be higher than the read voltage VR5, which corresponds to L5. It should be noted that the $V_{th}$ of target state 712 can be pre-determined differently if the 16 states are mapped to a different set of Gray codes.

As shown in FIG. 7B, the memory device can determine whether the memory cells are in target state 712 by applying a single read voltage. In some implementations, by applying a starting read voltage of one of the memory pages (that is, VR2 for the lower page, VR3 for the middle page, VR5 for the upper page, or VR1 for the upper page) to the selected word line, the majority of the memory cells coupled to the selected word line have $V_{th}$ higher than the starting read voltage and are thereby switched off. Only a few memory cells coupled to the selected word line have Vin lower than the starting read voltage and are thereby switched. In comparison, in the $V_{th}$ distribution 700 of FIG. 7A, a substantial amount of memory cells (e.g., memory cells in state PO) have $V_{th}$ lower than the starting read voltage. As such, the memory device can determine whether the page being read is a zero page by applying the starting read voltage.

For example, the memory device can determine a quantity of the failed memory cells (that is, memory cells having $V_{th}$ lower than the read voltage) corresponding to the starting read voltage, and compare the quantity of failed memory cells to a threshold. The threshold can be set as a value that is lower than 1/16 of the quantity of memory cells coupled to the selected word line in a QLC memory device, for example, 5% or 3% of the quantity of memory cells coupled to the selected word line, or any other suitable value. If the quantity of failed memory cells is less than the threshold, it indicates that memory page being read is a zero page. In such case, the memory device can end the read operation, and send a response (e.g., returning status Elh) to a memory controller to indicate that the memory page is a zero page, without sending data in the zero page to the memory controller. If the quantity of failed memory cells is greater than or equal to the threshold, it indicates that the memory page is not a zero page, and the memory device can proceed with the read operation by applying subsequent read voltages to read data from the memory page.

In some implementations, the memory device can be an xLC memory device, where x equals 3, 4, 5, or higher. The xLC memory device can program and identify zero pages by implementing a similar technical scheme as discussed with reference to FIG. 6B and FIG. 7B.

FIG. 8 illustrates an example process 800 of programming dummy data in a memory system, according to some aspects of the present disclosure.

The memory system can write (program) dummy data to one or more memory pages, by programming the one or more memory pages into zero pages. For example, the memory system can write dummy data to remaining memory pages of an open memory block during a power-loss protection operation (e.g., when an external power supply is disconnected), so that the open memory block can be closed. For another example, the memory system can write dummy data after a program operation that programs user data into a set of memory pages. The dummy data can be written into memory pages associated with a word line (e.g., WLn+1) adjacent to a last word line (e.g., WLn) where user data are programmed. As such, user data in the set of memory pages can be protected by the dummy data.

At 802, a request handler of a backend of the memory controller fetches a request to program dummy data from a flash translation layer (e.g., the FTL 510 of FIG. 5B) of the memory controller. The backend of the memory controller can be configured to handle communications between the memory controller and the memory device.

At 804, the FTL sends the request to program dummy data to the request handler.

At 806, the request handler sends a request to program zero pages in an SLC mode to a program handler of the backend. The request to program zero pages in an SLC mode indicates to program memory cells associated with the zero page to a target state (e.g., the target state 612 of FIG. 6B or the target state 712 of FIG. 7B) using a single program pulse. $V_{th}$ of the target state is higher than a starting read voltage of a set of read voltages for reading data from each memory page.

At 808, the program handler submits a program command to program zero pages in an SLC mode to a flash controller of the memory controller. The flash controller can be included in a back interface (e.g., the back interface 508 of FIG. 5A) of the memory controller.

At 810, in response to receiving the program command to program zero pages in an SLC mode, the flash controller disables an LDPC encoder (e.g., the LDPC encoder of the ECC circuit 507 of FIG. 5A) of the memory controller. As such, when sending a data pattern of all zeros to the memory device, the backend will not generate parity data, since parity data may disrupt the all-zero data pattern.

At 812, in response to receiving the program command to program zero pages in an SLC mode, the flash controller generates a plurality of micro-sequences corresponding to the program command, and sends the micro-sequences to the memory device. In response to the micro-sequences, the memory device can perform program operations on one or more memory pages indicated by the program command. The program operations can program the one or more memory pages into zero pages, by applying a single program pulse to each word line associated with the one or more memory pages. In some implementations, the program operation can program the one or more memory pages into zero pages by applying more than one program pulse to each word line associated with the one or more memory pages.

In some implementations, the memory controller sends data (e.g., all-zero data pattern) to be written into the zero pages to the memory device. In some other implementations, the memory device is configured to write all zeros into the zero pages in response to receiving the command to write zero pages, without receiving data from the memory controller.

At 814, after completing the program operations, the memory device sends a response to the flash controller of the memory controller, where the response indicates that the program operations are completed.

At 816, the flash controller sends a response to a command queue (CQ) handler of the backend to indicate that the command to program zero pages is completed.

At 818, the CQ handler releases resources (e.g., descriptor, buffer) in the flash controller that are allocated for the command to program zero pages.

At 820, the CQ handler sends a command queue to the FTL indicating that the request to program dummy data is completed.

In some implementations, at 804, in response to receiving the request to program dummy data, the request handler sends a request to program zero pages in an xLC mode (e.g., an MLC mode, a TLC mode, a QLC mode, or a Penta-level cell (PLC) mode that corresponds to the storage density of the memory device) to a program handler of the backend. The request to program zero pages in an xLC mode indicates to program memory cells associated with the zero page to the target state (e.g., the target state 612 of FIG. 6A or the target state 712 of FIG. 7A) using one or more program pulse of an ISPP scheme.

FIG. 9 illustrates an example process 900 of identifying dummy data in a memory system, according to some aspects of the present disclosure.

The memory system can identify (read) dummy data by identifying whether a memory page is a zero page. Data comprised in a zero page can be identified as dummy data. For example, during a garbage collection operation, the memory system can quickly identify dummy data in a source memory block, so that only valid data are migrated from the source memory block to a target memory block. For another example, the memory system can identify zero pages by applying a single read voltage, without needing to read data from the zero page by applying a set of read voltages. As such, a read time of the read operation can be reduced.

At 902, the request handler of the backend fetches a request to identify dummy data from the FTL of the memory controller.

At 904, the FTL sends the request to identify dummy data to the request handler.

At 906, the request handler sends the request to identify dummy data to a read handler of the backend.

At 908, the read handler submits a read zero page command (e.g., with operation code "0033") to the flash controller of the memory controller. The read zero page command indicates to determine whether a memory page is a zero page by sensing memory cells associated with the memory page using a read voltage (e.g., the staring read voltage of a set of read voltage for reading data from the memory page). If a quantity of failed memory cells (memory cells having threshold voltages lower than the read voltage) is less than a threshold, the memory page is identified as a zero page.

At 910, in response to receiving the read zero page command, the flash controller generates a plurality of micro-sequences corresponding to the read zero page command. In response to the micro-sequences, the memory device can perform read operations on one or more memory pages indicated by the command. For example, a read operation can sense the memory cells associated with a memory page using the starting read voltage, and determine a quantity of failed memory cells.

At 912, if the quantity of failed memory cells is lower than the threshold, the memory device can send a response (e.g., status E1h) to the memory controller indicating that the memory page is a zero page. Further, the memory device can end the read operation, without applying read voltages subsequent to the starting read voltage. In such case, process 900 proceeds to 914. If the quantity of failed memory cells is greater than or equal to the threshold, the memory device can send a response (e.g., status E0h) to the memory controller indicating that the memory page is not a zero page. Further, the memory device can proceed with the read operation by applying subsequent read voltages to read data from the memory page. In such case, process 900 proceeds to 918.

At 914, the flash controller sends the response indicating that the memory page is a zero page.

At 916, the flash controller disables an LDPC decoder (e.g., the LDPC decoder of the ECC circuit 507 of FIG. 5A) of the memory controller, since the memory device does not send the data comprised in the zero page to the memory controller.

Alternatively, if the memory page is not a zero page, at 918, the flash controller sends the response indicating that the memory page is not a zero page.

At 920, the LDPC decoder decodes the data read from the memory page, so that the ECC circuit can determine whether the data is read successfully or contains error.

At 922, the flash controller sends a response to the CQ handler to indicate the read zero page command is completed.

At 924, the CQ handler releases resources (e.g., descriptor, buffer) in the flash controller that are allocated for the command to read zero pages.

At 926, the CQ handler sends a command queue to the FTL indicating that the request to identify dummy data is completed.

In some implementations, at 908, instead of submitting a read zero page command, the CQ handler can submit a normal read command (e.g., with operation code "0030"). Further, the flash controller can send configuration information (e.g., a set feature) to the memory device. The configuration information indicates to set an enable bit (e.g., a stored in a register of the memory device) from 0 to 1, which indicates to determine whether a memory page is a zero page during the read operation. As such, in response to receiving the normal read command and determining that the enable bit is set as 1, the memory device can identify zero pages during the read operation.

FIG. 10 illustrates a flow chart of an example method 1000 of operating a memory system, according to some aspects of the present disclosure. Method 1000 can be performed by any suitable device or system as described herein, for example, according to the example techniques described with respect to FIGS. 1-9. For example, method 1000 can be performed by a memory system, such as the memory system 102 of FIG. 1 that includes a memory device (e.g., the memory device 104 of FIGS. 1-2B and 5, the memory device 300 of FIGS. 3-4) and a memory controller (e.g., the memory controller 106 of FIGS. 1-2B and 5).

The operations shown in method 1000 may not be exhaustive and that other operations can be performed as well before, after, or in between any of the illustrated operations. Further, some of the operations may be performed simultaneously, or in a different order than shown in FIG. 10. In some implementations, some of the operations may be performed by one or more components of a device or a system, such as, the memory controller or the memory device of the memory system.

At 1002, the memory controller sends a first command (e.g., a read zero page command of FIG. 9) to the memory device. The first command indicates to identify dummy data.

In some implementations, the memory system identifies dummy data by determining whether a memory page is a zero page. For example, the memory device performs a read operation on the first memory page based on a starting read voltage. The memory device then determines a quantity of failed memory cells in the first memory page, where threshold voltages of the failed memory cells are lower than the starting read voltage. In response to determining that the quantity of failed memory cells is less than a threshold (e.g., 5% of all memory cells in the first memory page), the memory device sends the response indicating that the first memory page is a zero page.

In some implementations, the memory controller is configured to send the first command during a garbage collection of the memory system, so that dummy data in a source memory block can be quickly identified.

At 1004, in response to receiving a response from the memory device indicating that a first memory page of the memory device is a zero page, the memory controller determines data comprised in the first memory page as dummy data.

In some implementations, the memory device sends the response indicating that the first memory page is a zero page, without sending the data comprised in the first memory page to the memory controller.

At 1006, the memory controller sends a second command (e.g., a program command to program zero pages in SLC mode in FIG. 8) to the memory device. The second command indicates to write dummy data in a second memory page of the memory device.

At 1008, the memory device programs the second memory page into a zero page. Threshold voltages of memory cells of the zero page are higher than a preset level (e.g., VR3 for TLC, or VR5 for QLC), where the preset level is higher than a starting read level for reading the second memory page.

In some implementations, the memory controller is configured to send the second command during a power-loss protection operation to write dummy data in memory pages of an open memory block to quickly close the open memory block.

In some implementations, the memory controller is configured to send the second command after a program operation for programming user data into one or more memory pages. The second memory command can indicate to write dummy data in a memory page (a memory page associated with WLn+1) that immediately follows a last memory page (e.g., a memory page associated with WLn) of the one or more memory pages.

The present disclosure also provides a non-transitory computer-readable storage medium. The non-transitory computer-readable storage medium stores one or more instructions (e.g., firmware of a memory controller) that are executable by a computer system. When being executed by the computer system, the instructions in the storage medium can implement method for programming and identifying dummy data as shown in FIGS. 6A-9.

The non-transitory computer-readable storage medium can be an internal storage unit of the device described in any of the foregoing embodiments. For example, the non-transitory computer-readable storage medium can be a hard disk or an internal memory of the device. The non-transitory computer-readable storage medium can also be an external storage device of the device, such as a plug-in hard disk, a smart media card (SMC), a secure digital (SD) card, a flash card, etc. Further, the non-transitory computer-readable storage medium can also include an internal storage unit and the external storage device.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting, information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range form should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multi-tasking or parallel processing (or a combination of multi-tasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A memory system, comprising:
a memory device comprising memory pages; and
a memory controller coupled to the memory device, wherein the memory controller is configured to:
send, to the memory device, a first command indicating to identify dummy data; and
in response to receiving, from the memory device, a response indicating that a first memory page is a zero page, determine data comprised in the first memory page as dummy data.

2. The memory system of claim 1, wherein the memory controller is further configured to:
send a second command indicating to write dummy data in a second memory page, wherein the memory device is configured to:
in response to receiving the second command, program the second memory page into a zero page, wherein threshold voltages of memory cells of the zero page are higher than a preset level, wherein the preset level is higher than a starting read level for reading the second memory page.

3. The memory system of claim 2, wherein the second command indicates to program the second memory page based on a single-level cell (SLC) mode.

4. The memory system of claim 3, wherein programming the second memory page based on the SLC mode comprises:
programming, using a single program pulse, memory cells of the second memory page above the preset level.

5. The memory system of claim 2, wherein a low density parity check (LDPC) encoder of the memory controller is disabled when programming the second memory page.

6. The memory system of claim 1, wherein the memory device is configured to:
send the response indicating that the first memory page is a zero page, without sending the data comprised in the first memory page to the memory controller.

7. The memory system of claim 1, wherein the memory device is configured to:
perform, based on a starting read voltage, a read operation on the first memory page;
determine a quantity of failed memory cells in the first memory page, wherein threshold voltages of the failed memory cells are lower than the starting read voltage; and
in response to determining that the quantity of failed memory cells is less than a threshold, send the response indicating that the first memory page is a zero page.

8. The memory system of claim 1, wherein the memory controller is configured to send the first command during a garbage collection operation of the memory system.

9. The memory system of claim 2, wherein the memory controller is configured to send the second command during a power-loss protection operation, wherein the second memory page is comprised in an open memory block.

10. The memory system of claim 2, wherein the memory controller is configured to send the second command after a program operation for programming user data into one or more memory pages, wherein the second memory page immediately follows a last memory page of the one or more memory pages.

11. A memory controller, comprising:
at least one processor and an interface, wherein the at least one processor is configured to:
send, through the interface to a memory device, a first command that indicates to identify dummy data; and
in response to receiving, through the interface from the memory device, a response indicating that a first memory page is a zero page, determine data comprised in the first memory page as dummy data.

12. The memory controller of claim 11, wherein the memory controller is configured to:
send a second command indicating to write dummy data in a second memory page, wherein the second command indicates to program the second memory page based on a single-level cell (SLC) mode.

13. The memory controller of claim 12, wherein a low density parity check (LDPC) encoder of the memory controller is disabled when programming the second memory page.

14. The memory controller of claim 12, wherein the memory controller is configured to send the second command during a power-loss protection operation, wherein the second memory page is comprised in an open memory block.

15. The memory controller of claim 12, wherein the memory controller is configured to send the second command after a program operation for programming user data into one or more memory pages, wherein the second memory page immediately follows a last memory page of the one or more memory pages.

16. The memory controller of claim 11, wherein the memory controller is configured to send the first command during a garbage collection operation.

17. A method of operating a memory system, comprising:

sending, from a memory controller of the memory system to a memory device of the memory system, a first command that indicates to identify dummy data; and in response to receiving, by the memory controller from the memory device, a response indicating that a first memory page of the memory device is a zero page, determining data comprised in the first memory page as dummy data.

18. The method of claim 17, further comprising:

performing, based on a starting read voltage, a read operation on the first memory page;

determining a quantity of failed memory cells in the first memory page, wherein threshold voltages of the failed memory cells are lower than the starting read voltage; and in response to determining that the quantity of failed memory cells is less than a threshold, sending, from the memory device to the memory controller, the response indicating that the first memory page is a zero page.

19. The method of claim 17, comprising:

sending, from the memory controller to the memory device, a second command indicating to write dummy data in a second memory page of the memory device; and programming, by the memory device, the second memory page into a zero page, wherein threshold voltages of memory cells of the zero page are higher than a preset level, wherein the preset level is higher than a starting read level for reading the second memory page.

20. The method of claim 17, comprising:

sending, from the memory device to the memory controller, the response indicating that the first memory page is a zero page, without sending the data comprised in the first memory page.

* * * * *